United States Patent [19]
Ohyama et al.

[11] Patent Number: 5,995,467
[45] Date of Patent: Nov. 30, 1999

[54] DISC RECORDING AND/OR REPRODUCING APPARATUS WITH A LIFTABLE OPTICAL PICKUP APPARATUS AND COORDINATED LENS SHUTTER

[75] Inventors: Masao Ohyama, Tokyo; Yoshinori Yamamoto, Kanagawa, both of Japan

[73] Assignee: Sony Corporation, Tokyo, Japan

[21] Appl. No.: 08/895,509

[22] Filed: Jul. 16, 1997

[30]     Foreign Application Priority Data

Jul. 25, 1996 [JP] Japan ..................................... 8-213341
Aug. 5, 1996 [JP] Japan ..................................... 8-220734

[51] Int. Cl.[6] ..................................................... G11B 3/58
[52] U.S. Cl. ............................................... 369/71; 369/72
[58] Field of Search ................................... 369/33, 72, 71,
369/75.1, 75.2, 77.1, 77.2, 13, 291, 44.11,
47, 54, 258; 360/128, 133, 48, 99.06, 99.07

[56]              References Cited

U.S. PATENT DOCUMENTS

| 5,172,361 | 12/1992 | Urushibata et al. | 369/77.1 |
| 5,245,601 | 9/1993 | Hake | 369/72 |
| 5,615,196 | 3/1997 | Kato | 369/71 |

FOREIGN PATENT DOCUMENTS

| 19523785 A1 | 1/1996 | Germany. |
| WO 90/06576 | 6/1990 | WIPO. |

OTHER PUBLICATIONS

Japio Abstract, Section P 865, JP 1–13235 (A), Published Jan. 18, 1989, Matsushita Electric Ind Co Ltd.
Japio Abstract, Section P 829, Acession No. 02638939, JP 63–255839, Published Oct. 24, 1988, Matsushita Graphic Commun Syst Inc.
Japio Abstract, Section P 778, Acession No. 02529335, JP 63–146235, Published Jun. 18, 1988, Canon Inc.
Japio Abstract, Section P 574, Acession No. 02065943, JP 61–280043, Published Dec. 10, 1986, Nec Eng Ltd.
Japio Abstract, Section P 551, Acession No. 02010051, JP 61–224151, Published Oct. 4, 1986, Canon Inc.
Japio Abstract, JP 56–22228 (A), Published Mar. 2, 1981, Matsushita Denki Sangyo K.K.
Patent Abstracts of Japan, vol. 13, No. 185 (P–865) (3533), JP 1–13235 (A), Published Jan. 18, 1989.

*Primary Examiner*—Ali Neyzari
*Attorney, Agent, or Firm*—Limbach & Limbach L.L.P.

[57]              ABSTRACT

An optical disc recording and/or reproducing apparatus includes a carrier mechanism, an optical pickup apparatus, a shutter and a moving mechanism. The carrier mechanism carries a disc inside and outside the apparatus. The optical pickup apparatus radiates beams on a disc carried by the carrier mechanism. The optical pickup apparatus is provided with an objective lens. The shutter exposes or closes the upper surface of the objective lens. The shutter is provided to the optical pickup apparatus so that the shutter can be moved between a first position for exposing the upper surface of the objective lens and a second position for closing the upper surface of the objective lens. The moving mechanism moves the shutter between the first position and the second position according to recording and/or reproducing operation.

18 Claims, 14 Drawing Sheets

DISC RECORDING AND/OR REPRODUCING APPARATUS WITH A LIFTABLE OPTICAL PICKUP APPARATUS AND COORDINATED LENS SHUTTER

BACKGROUND

1. Field of the Invention

The present invention relates to a disc recording and/or reproducing apparatus and an optical pickup apparatus, particularly relates to a disc recording and/or reproducing apparatus and an optical pickup apparatus provided with constitution for preventing an objective lens from being contaminated.

2. Background of the Invention

For example, in equipment (hereinafter, called an optical disc drive) for reading information recorded on an optical disc or recording information on an optical disc by radiating a laser beam on an optical disc of a compact disc (CD) player and others, an optical pickup apparatus provided with various optical components such as an objective lens, a beam splitter and a laser diode is used.

In the above optical pickup apparatus, the positional relationship among each optical component and optical characteristics are strictly adjusted so that a laser beam is a beam spot with desired size and irradiates the recording surface of an optical disc.

In an optical disc drive using the above optical pickup apparatus, a malfunction caused by the optical pickup apparatus occurs very frequently. That is, as information cannot be reproduced or recorded from/on an optical disc and an error occurs in reading information required for controlling the relative position of an optical pickup apparatus to an optical disc because dust and others which get into an optical disc drive adhere on the surface of an optical component such as an objective lens of an optical pickup apparatus and these deteriorate the optical characteristics of the optical component, most of such malfunctions are caused.

Therefore, to prevent such a malfunction, there is a method of preventing dust and others from adhering on an optical pickup apparatus or a method of constituting so that dust and others are difficult to adhere on an optical pickup apparatus by sealing an optical disc drive as much as possible to prevent dust and others from getting into the optical disc drive from outside. The above method may be used for equipment constituted by only an optical disc drive, however, some equipment in which an optical disc drive and another device are combined cannot be sealed because of heat release and the above method is not general.

There is also a method of covering optical components when an optical pickup apparatus is not used, for example when an optical pickup apparatus is moved outside the outermost position of an optical disc. However, in the above method, a drive mechanism and others for opening and closing a cover are required to be all newly designed, the cost is increased and the realization is difficult because a drive mechanism for opening and closing the above cover is required to be added and distance in which an optical pickup apparatus is moved is extended.

SUMMARY OF THE INVENTION

It is therefore an object of the present invention to provide an optical disc recording and/or reproducing apparatus which resolves the above-mentioned problem.

It is another object of the present invention to provide an optical pickup apparatus used for recording and/or reproduction of an optical disc which resolves the above-mentioned problem.

According to the present invention, there is provided an optical disc recording and/or reproducing apparatus including a carrier mechanism, an optical pickup apparatus, a shutter and a moving mechanism. The carrier mechanism carries a disc inside and outside the optical disc recording and/or reproducing apparatus. The optical pickup apparatus radiates a beam on a disc carried by the carrier mechanism. The optical pickup apparatus is provided with an objective lens. The shutter exposes or covers the upper side of the objective lens by opening or closing. The shutter is provided on the optical pickup apparatus so that the shutter can be moved between a first position for exposing the upper side of the objective lens and a second position for covering the upper side of the objective lens. The moving mechanism moves the shutter between the first and second positions, interlocking the shutter with recording and/or reproducing operation.

According to the present invention, there is provided an optical pickup apparatus used for recording and/or reproduction of an optical disc including an objective lens, a shutter, a feed mechanism and a moving mechanism. The objective lens focuses beams on a disc. The shutter exposes or covers the upper side of the objective lens by opening or closing. The shutter is provided so that it can be moved between a first position for exposing the upper side of the objective lens and a second position for covering the upper side of the objective lens. The feed mechanism moves the optical pickup apparatus in the direction of the radius of a disc. The moving mechanism moves the shutter between the first and second positions, reacting the shutter against the operation of the feed mechanism.

According to the present invention, there is provided an optical disc recording and/or reproducing apparatus including a carrier mechanism, a chassis, a shutter and a lifting mechanism. The carrier mechanism carries a disc inside and outside the optical disc recording and/or reproducing apparatus. The chassis is provided with an optical pickup apparatus and a disc rotating mechanism. The optical pickup apparatus is provided with an objective lens and radiates beams on a disc carried by the carrier mechanism with beams focused by the objective lens. The disc rotating mechanism rotates a disc carried by the carrier mechanism. The shutter exposes or covers the upper side of the objective lens by opening or closing. The shutter is provided on the optical pickup apparatus so that the shutter can be moved between a first position for exposing the upper side of the objective lens and a second position for covering the upper side of the objective lens. The lifting mechanism lifts or lowers the chassis between a lifted position for rotating a disc carried by the carrier mechanism by the disc rotating mechanism and a lowered position for separating the disc rotating mechanism from a disc carried by the carrier mechanism. When the chassis is located in a lowered position at least by the lifting mechanism, the shutter is located in the second position.

DESCRIPTION OF THE PREFERRED EMBODIMENTS

Referring to drawings, a disc recording and/or reproducing apparatus equivalent to embodiments according to the present invention will be described in detail below. In each embodiment described below, the disc recording and/or reproducing apparatus will be described, giving a disc player for reproducing an optical disc such as a compact disc as an example. First, referring to FIGS. 1 to 8, a disc player equivalent to a first embodiment according to the present invention will be described.

First Embodiment

Figure 3:
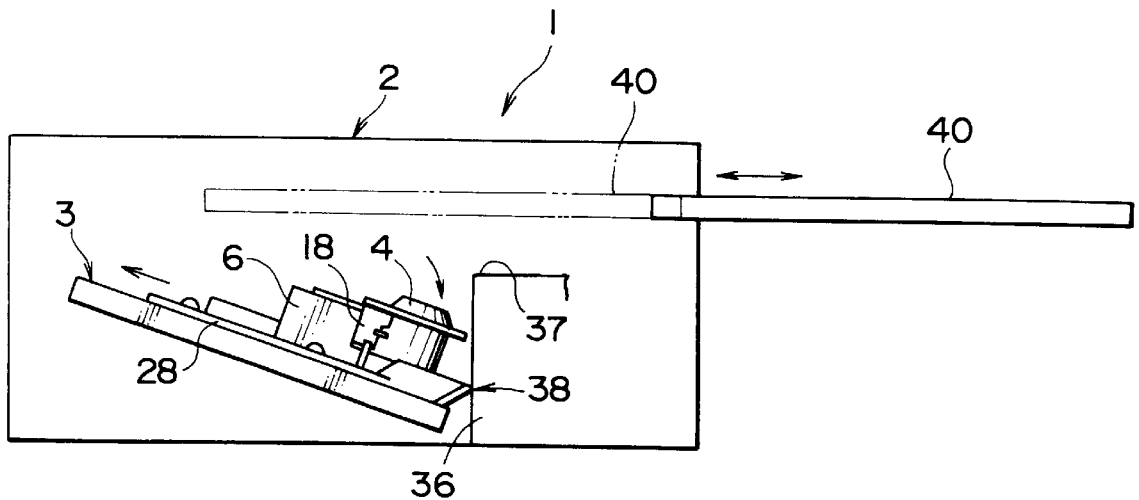
FIG. 3 is a side view showing schematic constitution when the mechanical chassis of the disc player equivalent to the first embodiment is lowered and a disc tray is pulled out.
Figure 4:
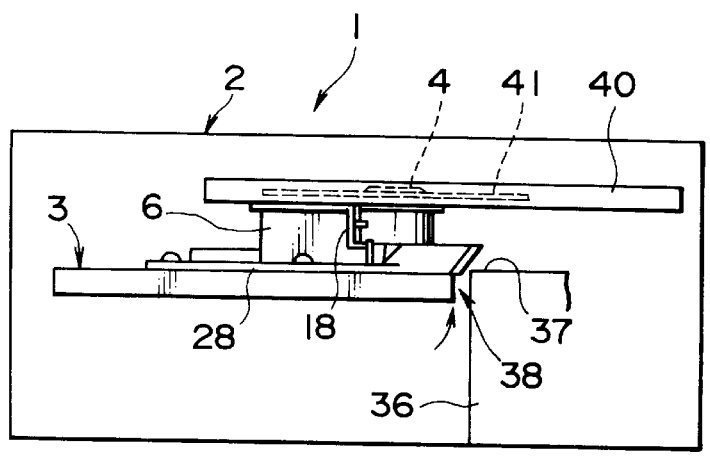
FIG. 4 is a side view showing schematic constitution when the mechanical chassis of the disc player equivalent to the first embodiment is lifted and a disc tray is housed.

The disc player 1 is provided with a disc tray 40 and a mechanical chassis 3 as shown in FIGS. 3 and 4. The disc tray 40 is moved between a position protruded from the opening of a housing 2 and a position housed in the housing 2. An optical disc is loaded onto the disc loading part not shown of the disc tray 40 or ejected from the disc loading part in a state in which the disc tray 40 is protruded from the housing as shown in FIG. 3. An optical disc carried by the disc tray 40 is chucked on a disc table described later by a chucking mechanism not shown in a position in which the disc tray 40 is housed in the housing 2 as shown in FIG. 4, the disc table is rotated and data is read from the optical disc by the optical pickup apparatus described later.

A mechanical chassis 3 is arranged inside the housing 2 of the disc player 1 as shown in FIG. 3. The rear end of mechanical chassis 3 is supported by the housing 2 so that the mechanical chassis can be turned, that is, when the mechanical chassis is shifted utilizing the rear end thereof as a supporting point for turning from a state in which the operation, that is, reproduction is stopped including when the disc tray 40 is loaded and unloaded to a state in which the operation, that is, reproduction is executed or when the mechanical chassis is shifted reversely, the mechanical chassis is supported so that the front end which functions as a turned end of the mechanical chassis is vertically moved and the mechanical chassis can be turned. The lifting and carrier mechanisms carry the disc tray 40 between a position in which the disc tray is pulled out from the housing 2 and a position in which the disc tray is housed in the housing 2 and move the mechanical chassis 3 vertically. The above lifting and carrier mechanisms are provided with a cam rotated by a motor. A gear for carrying the disc tray 40 by engaging a cam groove for vertically moving the mechanical chassis 3 by being fitted to the mechanical chassis 3 and a rack provided on the rear surface of the disc tray 40 is formed on the external surface of this cam. After the disc tray 40 is carried to, for example a position in which it is housed in the housing 2 by the gear of the cam and the rack of the disc tray 40, the cam is further rotated and the mechanical chassis 3 is lifted by the cam groove as described later. To carry the disc tray 40 to a position in which it is pulled out from the housing 2, first the mechanical chassis 3 is lowered by the cam groove of the cam and the disc tray 40 is carried by the gear and the rack of the tray 40 by the further rotation of the cam. A state shown in FIG. 3 is a state in which the lowering of the mechanical chassis 3 is completed, that is, a state in which the operation of the mechanical chassis 3 is stopped and a state in which the disc tray 40 is loaded and unloaded, a state shown in FIG. 4 is a state in which the lifting of the mechanical chassis 3 is completed, that is, a state in which the mechanical chassis 3 is operated. For a mechanism for carrying the disc tray 40 and vertically moving the mechanical chassis 3, refer to Japanese laid open patent No. 2-66772, U.S. Pat. No. 5,172,361 and others.

A disc table 4 rotated by a spindle motor not shown is provided on the upper surface of the part close to the front end of the mechanical chassis 3. An opening 5 which is substantially in the shape of a rectangle longer back and forth is provided in the center of the upper surface of the mechanical chassis 3.

Figure 1:
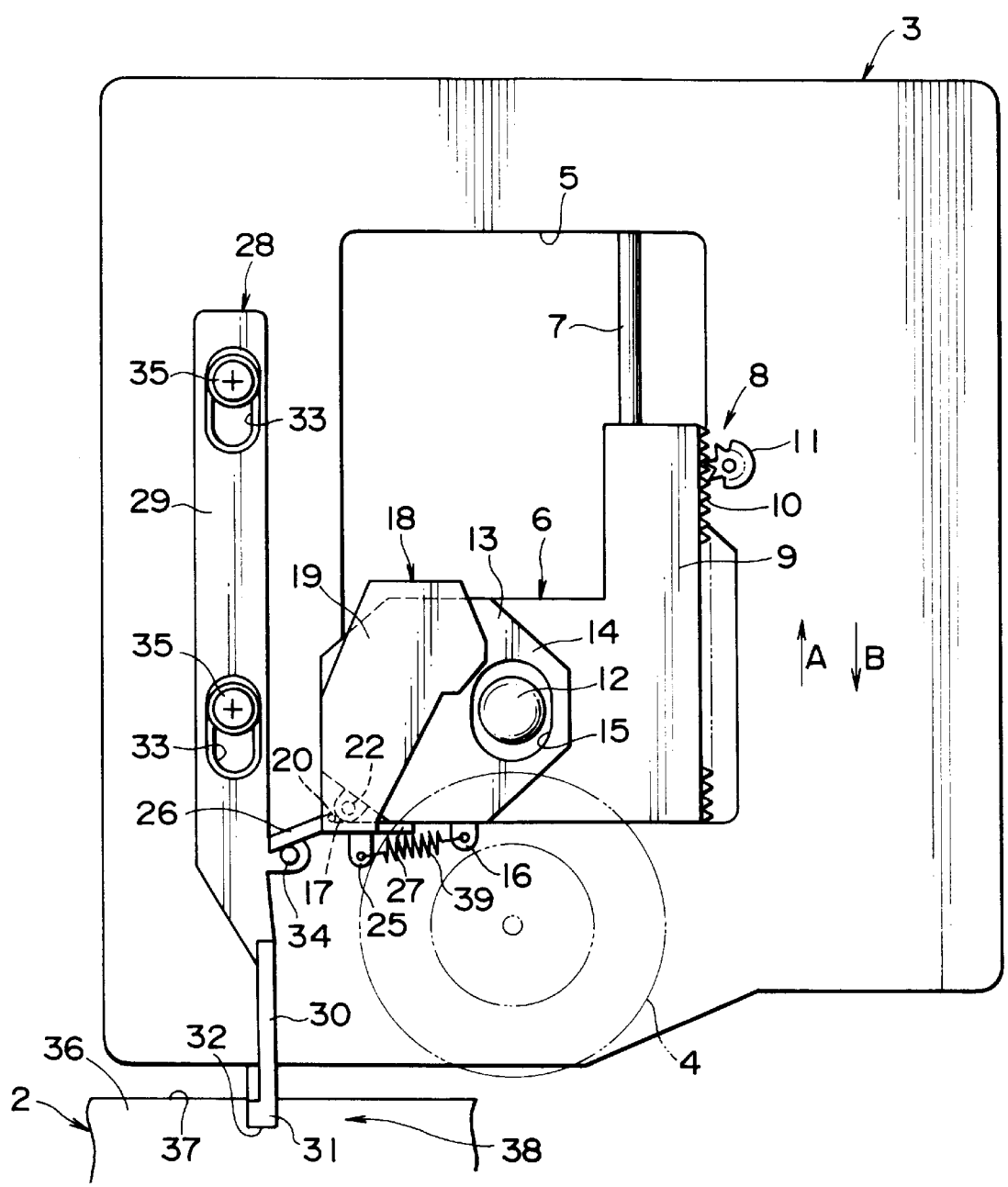
FIG. 1 is a plan showing a state in which the mechanical chassis of a disc player as a disc recording and/or reproducing apparatus equivalent to a first embodiment according to the present invention is located in a lifted position and a shutter is located in an open position.
Figure 20:
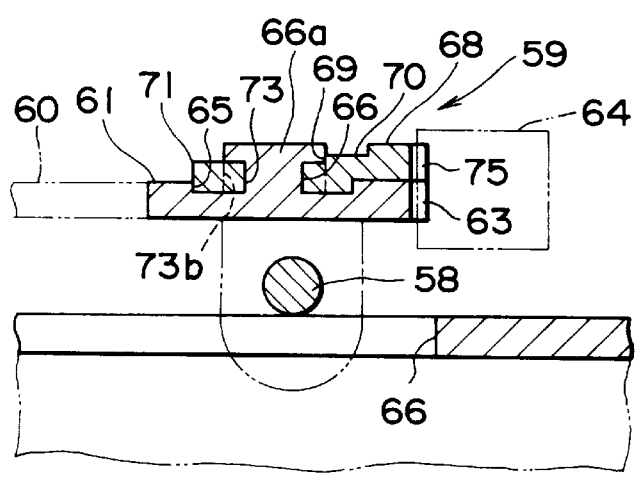
FIG. 20 is an enlarged sectional view viewed along a line XII—XII in FIG. 19.

An optical pickup apparatus 6 is arranged on the side of the upper surface of the mechanical chassis 3 and in the opening 5 so that the optical pickup apparatus 6 can be moved in the direction of the radius of a disc shown by arrows A and B in FIG. 1 by a feed mechanism 8, being guided by a feed shaft 7. The feed mechanism 8 consists of a pinion 11 and others driven by a motor not shown engaged with a rack 10 provided on the right side of a base 9 of the optical pickup apparatus 6 as shown in FIG. 20 and the optical pickup apparatus 6 is moved back and forth according to the rotation of the pinion 11. The optical pickup apparatus 6 is located in the outermost position of an optical disc when the optical pickup apparatus is moved to the rearmost position of the mechanical chassis 3 in the direction shown by an arrow A in FIG. 1, that is, to the upper end of the opening 5 in FIG. 1 and on the contrary, located in the innermost position of the optical disc when the optical pickup apparatus is moved to the forwardest position of the mechanical chassis 3 in the direction shown by an arrow B in FIG. 1, that is, to the lower end of the opening 5 shown in FIG. 1. The optical pickup apparatus 6 is normally located in the innermost position of an optical disc when reproducing operation is started and ended.

The optical pickup apparatus 6 consists of various optical components such as an objective lens 12, a beam splitter not shown and a laser diode not shown, these components are arranged in a predetermined position on the above base 9 and are covered with a case body 13. Beams radiated from a laser diode is focused on the signal recorded surface of an optical disc with the objective lens 12. The photo detector of the optical pickup apparatus 6 receives beams reflected on the signal recorded surface of the optical disc. The regenerative signal of data recorded on the optical disc and an error signal of a focusing error, a tracking error and others are generated based upon output from the above photo detector.

Figure 2:
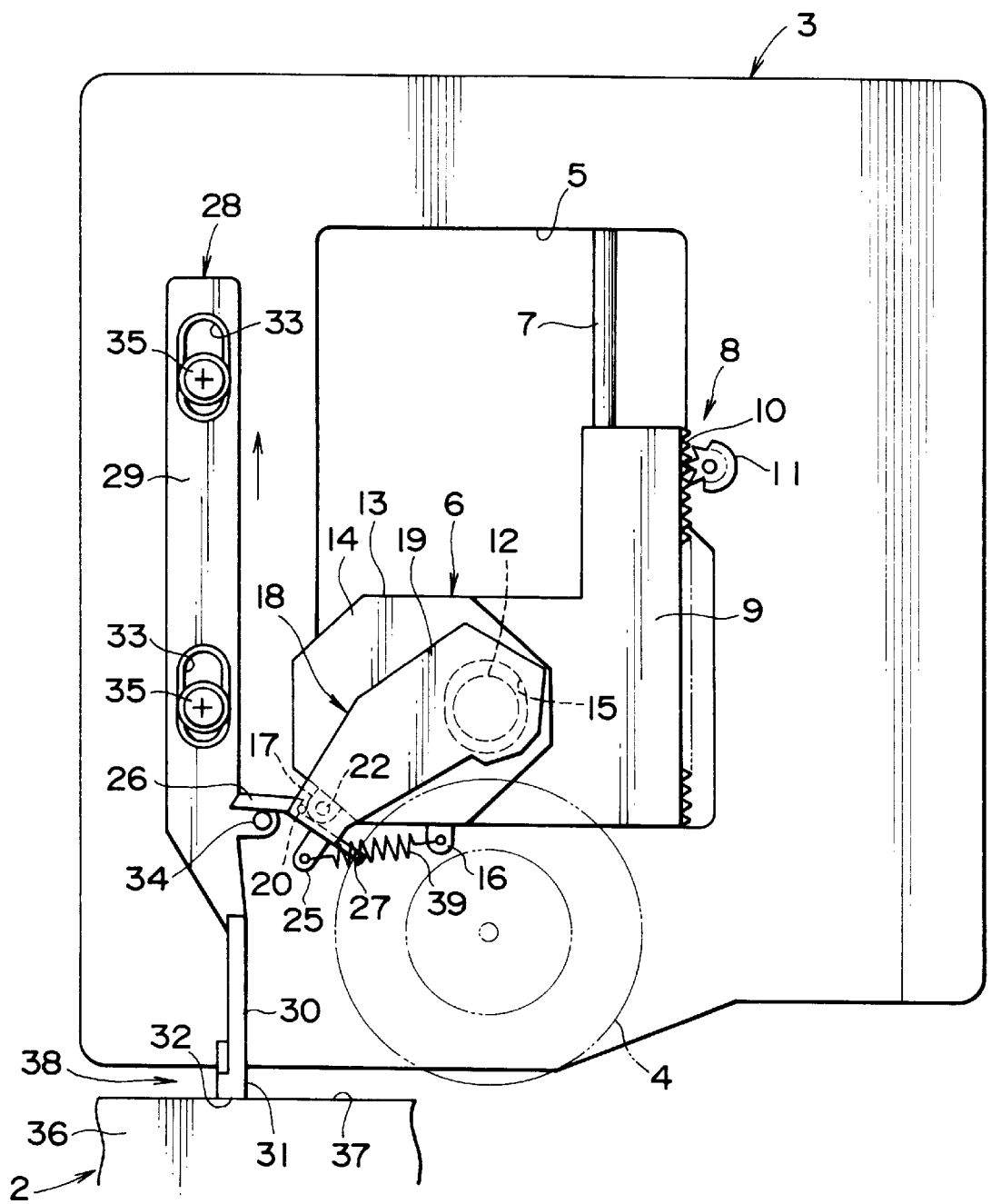
FIG. 2 is a plan showing a state in which the mechanical chassis of the disc player equivalent to the first embodiment is located in a lowered position and a shutter is located in a closed position.
Figure 8:
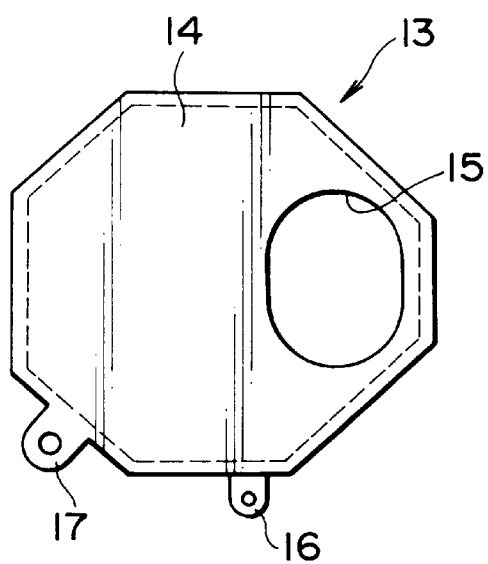
FIG. 8 is a plan showing a case body.

The case body 13 is a cover the dimension in the directions shown by the arrows A and B in FIG. 1 of which is shorter than the dimension in the direction perpendicular to the above dimension and which is substantially in the shape of a little flat octagon when viewed from the top of the optical pickup apparatus 6 as shown in FIGS. 1, 2 and 8 and is fixed on the base 9 with the case body covering the various optical components. A substantially elliptic hole 15 is formed on the right side of the upper surface 14 of the case body 13 and the objective lens 12 is exposed outside via the hole 15. A spring fitting piece 16 and a boss 17 are respectively formed on the side of the case body 13 on the side of the disc table 4.

Figure 7:
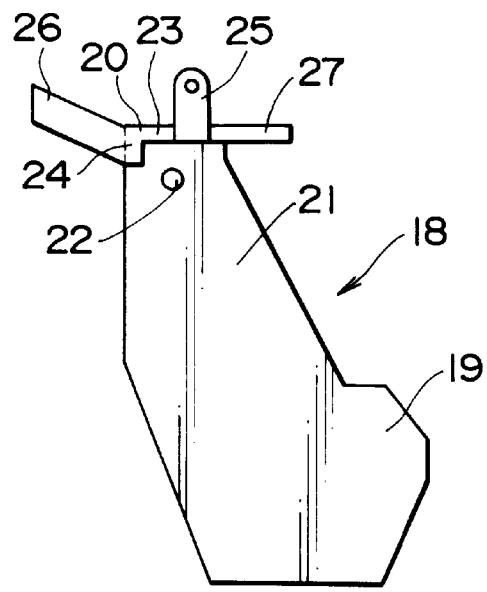
FIG. 7 is a bottom view showing the shutter in the first embodiment.

The shutter 18 is formed by integrating a thin plate in the shape like a rice scoop bent a little on the right side halfway, that is, a main part 19 in such a shape that the lateral width is wider in the rear part, that is, in the direction shown by the arrow A in FIG. 1, a fitting part 20 extended downward substantially perpendicularly from the front edge of the main part 19, that is, the edge on the side of the disc table 4 shown in FIG. 1 and a part of the left hedge connecting with the front edge and a turning shaft 22 located in a position close to the front end of the lower surface 21 of the main part 19 and vertically protruded downward from a little rear position of the fitting part 20 as shown in FIGS. 1, 2 and 7. The shutter 18 is formed by synthetic resin or metallic material.

For the form viewed from the top of the fitting part 20, the wall faces of the fitting part continuing from the front edge of the main part 19 and the left edge connecting with the front edge make a right angle with the main part as shown in FIG. 7 and form the front wall 23 and the left wall 24 which are substantially in the shape of a letter L. The lower part from an intermediate position of the right half of the front wall 23 is bent forward perpendicularly and protruded integrally as a spring fitting piece 25. A pressed piece 26 is protruded integrally diagonally forward from the lower end of the left wall 24. A stopper piece 27 is protruded integrally rightward from the upper part of the front wall 23.

A slider 28 is as a whole substantially in the shape of a plate longer back and forth as shown in FIGS. 1 and 2 and a main part 29 extended horizontally and an acting part 30 protruded forward from the front end of the main part 29 and rising upward, that is, in such a shape as is twisted by 90 in a boundary between the main part 29 and the acting part 30 are integrated. The front end 31 of the acting part 30 is formed a little thicker than the other part thereof and the acting face 32 is formed diagonally so that the front end face of the acting part is dislocated back in the lower part of the front end face.

The slider 28 is formed by synthetic resin which slides satisfactorily because the friction coefficient of the surface is low and in addition, which is excellent in abrasion resistance. Long holes 33 longer back and forth are formed in two locations in the main part 29 back and forth in a straight line and further, a pressing shaft 34 is integrally protruded vertically upward from a part protruded a little to the right from the right edge of the main part 29 between the front long hole 33 and a boundary between the main part 29 and the acting part 30.

Figure 5:
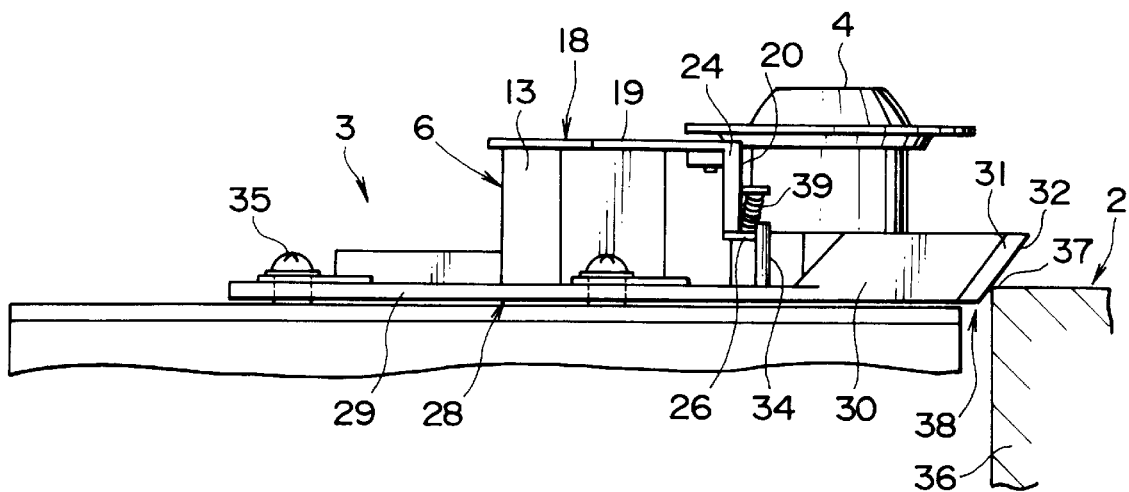
FIG. 5 is a side view enlarging the main part when the mechanical chassis is located in a lifted position.

The slider 28 is attached to the upper surface of the mechanical chassis 3 by machine screws 35 spirally fitted to the mechanical chassis 3 through the long holes 33 so that the slider is guided by the machine screws 35 and slid back and forth on the mechanical chassis 3 by relatively moving the machine screws 35 back and forth in the long holes 33 respectively. When the optical pickup apparatus 6 is moved in the innermost position of an optical disc, the pressed piece 26 of the shutter 18 presses the pressing shaft 34 of the slider 28, the slider 28 is moved forward, the acting part 30 is protruded forwarder than the front end face of the mechanical chassis 3 and the upper edge 37 of the wall part 36 inside the housing 2 comes in contact with the lower part of the acting face 32 or approaches it as shown in FIGS. 1 and 5. A shutter driving mechanism 38 is constituted by these sliders 28 and wall part 36.

The shutter 18 is attached to the case body 13 in the following state as shown in FIGS. 1 and 2. The shutter is attached to the case body 13 by inserting the turning shaft 22 in a hole in the center of the boss 17 of the case body 13 so that the shutter can be turned and a coil spring 39 is stretched between the spring fitting piece 16 of the case body 13 and the spring fitting piece 25 of the shutter 18. At this time, the main part 19 is located with it covering a part of the upper surface 14 of the case body 13, the stopper piece 27 comes in contact with the front of the case body 13 and prevents the case body from being turned counterclockwise when viewed from the top, which is caused due to the tensile force of the coil spring 39 and unnecessary. The pressed piece 26 is greatly protruded diagonally forward on the left side of the case body 13, comes in contact with the pressing shaft 34 of the slider 28 located ahead of the pressed piece, if the optical pickup apparatus 6 is located in the innermost position of an optical disc, the slider 28 is pressed and moved in the direction shown by the arrow B in FIG. 1 because the spring of the coil spring 39 acts via the pressed piece 26 and the pressing shaft 34 and the acting face 32 elastically comes in contact with the upper edge 37 of the wall part 36 or approaches it.

The operation of the disc player 1 and the operation of the shutter in accordance with this will be described below.

As shown in FIG. 3, an optical disc 41 is loaded or unloaded onto/from a disc loaded surface thereof not shown with the disc tray 40 pulled out from the front of the housing 2 (in a pulled-out position). The front end of the mechanical chassis 3 is held with it lowered when the disc tray 40 is located in a pulled position. The shutter 18 closes the hole 15 of the case body 13. The optical disc 41 is reproduced with the disc tray 40 pulled in the housing 2 (in a pulled-in position) as shown in FIG. 4.

When an instruction to reproduce the optical disc 41 is input by being operated on an operator console not shown of the disc player 1 after the disc tray 40 reaches a pulled-in position, the front end of the lowered mechanical chassis 3 is raised as shown in FIG. 4, the disc table 4 is also raised accordingly, the upper surface thereof comes in contact with the lower surface in the center of the optical disc 41, the optical disc 41 is lifted from the disc loaded surface of the disc tray 40 when the disc table 4 is a little lifted. At this time, the shutter 18 is moved in a position in which the hole 15 is exposed. In this state, the optical disc 41 is chucked by the disc table 4 and a chucking mechanism not shown, as the disc table 4 is rotated by the spindle motor, the optical disc 41 is rotated and the optical pickup apparatus 6 moved in the inner most position of the optical disc 41 on the mechanical chassis 3 is moved in the radial direction of the optical disc 41 by the feed mechanism 8 so as to read a signal from the optical disc 41.

When an instruction to stop the reproduction of the optical disc 41 is input via the operator console of the disc player 1, the rotation of the disc table 4 is stopped, the optical pickup apparatus 6 is simultaneously moved to the innermost position of the optical disc 41 by the feed mechanism 8, the front end of the mechanical chassis 3 is lowered and the optical disc 41 is loaded onto the disc loaded surface of the disc tray 40. When an instruction to eject the disc is issued, the disc tray 40 is moved from the pulled-in position to the pulled-out position by the carrier mechanism of the disc tray not shown after the optical disc 41 is loaded onto the disc loaded surface of the disc tray 40 in addition to the operation when the instruction to stop reproduction is issued.

Figure 6:
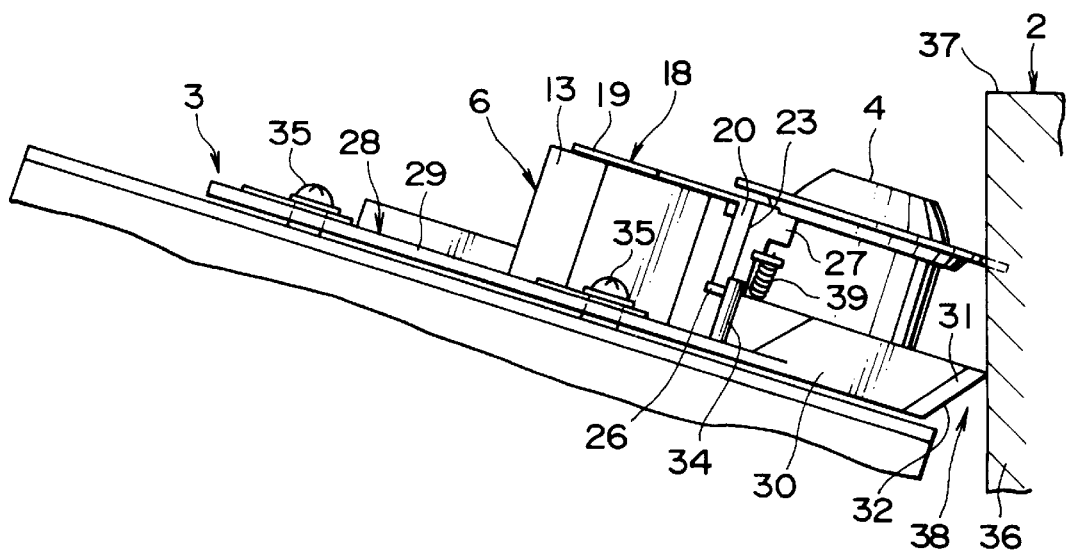
FIG. 6 is a side view enlarging the main part when the mechanical chassis is located in a lowered position.

The main part 19 of the shutter 18 is moved between the closed position for covering the hole 15 to hide the objective lens 12 of the optical pickup apparatus 6 as shown in FIGS. 2 and 6 and the open position for exposing the objective lens 12 without covering the hole 15 as shown in FIGS. 1 and 5 on the upper surface 14 of the case body 13 by the shutter driving mechanism 38 when the front end of the mechanical chassis 3 is lifted or lowered in each operation of the disc player 1.

When the optical pickup apparatus 6 is moved to a position corresponding to the innermost of the optical disc 41, the pressed piece 26 of the shutter 18 and the pressing shaft 34 come in contact as shown in FIGS. 1 and 5, force for moving the slider 28 in the direction shown by the arrow B in FIG. 1 is energized by the spring transmitted by this contact of the coil spring 39 because the spring of the coil spring 39 acts via the pressed piece 26 and the pressing shaft 34, and the lower part of the acting face 32 elastically comes in contact with the upper edge 37 of the cam 36 or approaches it. The upper edge 37 of the cam 36 inside the housing 2 is relatively lifted with it elastically in contact with the acting face 32 of the slider 28 as the front end of the mechanical chassis 3 is lowered. At this time, as the acting face 32 is displaced forward as it is lifted, the acting face is pressed by the upper edge 37 of the cam 36, the acting face 32 is displaced backward and the slider 28 is moved backward. As a result, the pressing shaft 34 of the slider 28 presses the pressed piece 26 of the shutter 18 backward, the shutter 18 is turned clockwise when viewed from the top with the turning shaft 22 as the center and moved in the closed position shown in FIGS. 2 and 6.

In the meantime, as the front end of the mechanical chassis 3 is lifted, the upper edge 37 of the cam 36 is relatively lowered. At this time, as the acting face 32 of the slider 28 is elastically in contact with the upper edge 37 of the cam 36 by the pressure of the coil spring 39 which acts via the pressed piece 26 of the shutter 18, the slider 28 is gradually moved forward as the front end of the mechanical chassis 3 is lifted, the shutter 18 is turned counterclockwise when viewed from the top and as a result, is automatically returned to the open position as shown in FIGS. 1 and 5.

As described above, in the disc player 1 equivalent to the first embodiment, the upper edge 37 of the cam 36 inside the housing 2 is relatively lifted or lowered as the front end of the mechanical chassis 3 is lowered or lifted, moreover comes in contact with the slider 28, the contact between the upper edge 37 of the cam 36 and the acting face 32 of the slider 28 is transmitted to the slider 28 and moves the slider back and forth so as to move the shutter 18.

Second Embodiment

Figure 15:
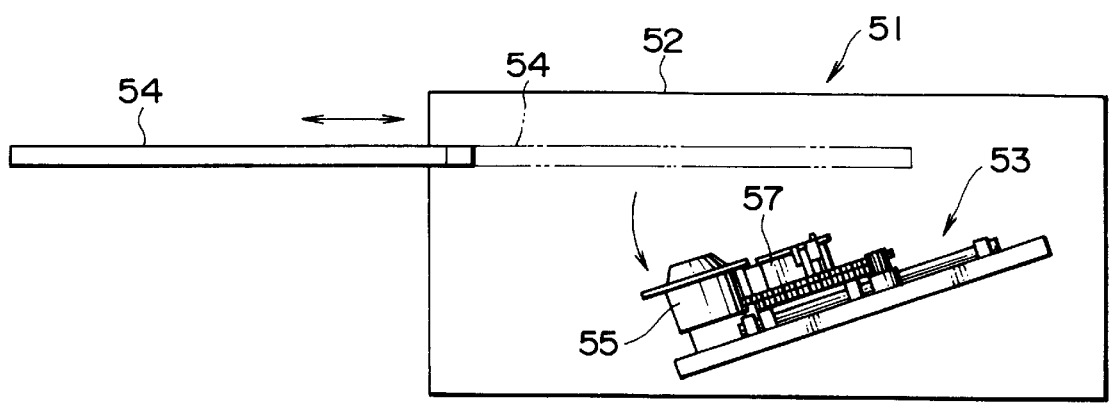
FIG. 15 is a side view showing schematic constitution when the mechanical chassis of the disc player equivalent to the second embodiment is lowered and a disc tray is pulled out.
Figure 16:
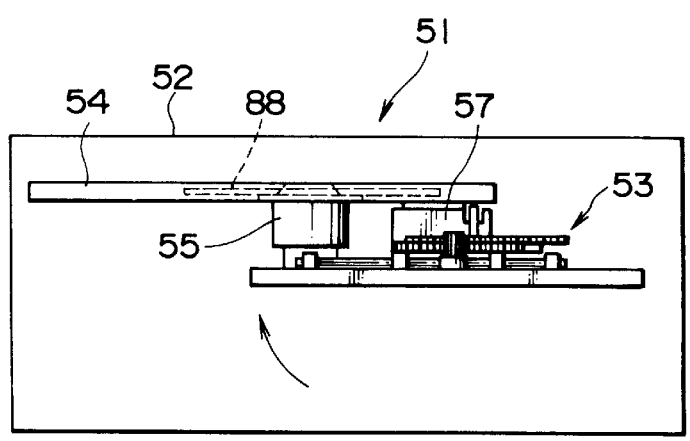
FIG. 16 is a side view showing schematic constitution when the mechanical chassis of the disc player equivalent to the second embodiment is lifted and a disc tray is housed.

Next, referring to FIGS. 9 to 20, a disc player 51 equivalent to a second embodiment according to the present invention will be described. The disc player 51 is provided with a disc tray 54 and a chassis 53 as shown in FIGS. 15 and 16. The disc tray 54 is moved between a position in which it is protruded from the opening of a housing 52 as shown in FIG. 15 and a position in which it is housed in the housing 52 as shown in FIG. 16 by the moving mechanism not shown of the disc tray. An optical disc is loaded or unloaded onto/from the disc loading part not shown of the disc tray 54 in a position in which the disc tray 54 is pulled out from the housing 52 as shown in FIG. 15. As shown in FIG. 16, an optical disc carried by the disc tray 54 together with a disc table described later is chucked by a chucking mechanism not shown provided in the housing 52 in a position in which the disc tray 54 is housed in the housing 52 and data is read from the optical disc by an optical pickup apparatus described later.

A mechanism for carrying and lifting the disc tray 54 and the mechanical chassis 53 shall be constituted as in the above first embodiment.

The mechanical chassis 53 is arranged inside the housing 52. The rear end of the mechanical chassis 53 is supported by the housing 52 so that the mechanical chassis can be turned.

That is, the disc player 51 is constituted so that the front end which functions as the turning end of the mechanical chassis is vertically moved utilizing the rear end thereof as a supporting point for turning when the disc tray 54 is loaded or unloaded. A state shown in FIG. 15 is a state in which the lowering of the mechanical chassis 53 is finished, that is, a state in loading and unloading, and a state shown in FIG. 16 is a state in which the lifting of the mechanical chassis 53 is finished, that is, a state in which the mechanical chassis 53 is operated, that is, reproduction is executed and reproduction is stopped except in loading and unloading. The front end of the mechanical chassis 53 is vertically moved by a mechanism not shown, being interlocked with the movement of the disc tray 54 as in the above first embodiment.

In the disc player 51, it is because reproduction can be started promptly when an optical disc on the disc tray 54 is reproduced as it is without exchanging the optical disc that the front end of the mechanical chassis 53 is not lowered except in the loading and unloading of the disc tray 54.

A disc table 55 rotated by a spindle motor not shown is provided on the upper surface of a part close to the front end of the mechanical chassis 53. An opening 56 longer back and forth substantially in the shape of a rectangle is provided in the center of the upper surface of the mechanical chassis 53.

An optical pickup apparatus 57 is arranged on the side of the upper surface of the mechanical chassis 53 and above the opening 56 so that the optical pickup apparatus can be moved in the radial direction of an optical disc by a feed mechanism 59, being guided by a feeding shaft 58.

The feed mechanism 59 is provided with a rack 63 provided on the right side of a rack part 61 which is a rectangular area substantially longer back and forth on the right side of a base 60 of the optical pickup apparatus 57 except a part cut out 62 at the rear end of the right side, a pinion 64 engaged with the rack 63 and driven by a motor not shown and others. The feed mechanism 59 moves the optical pickup apparatus 57 in the radial direction of an optical disc in accordance with the rotation of the pinion 64.

Figure 9:
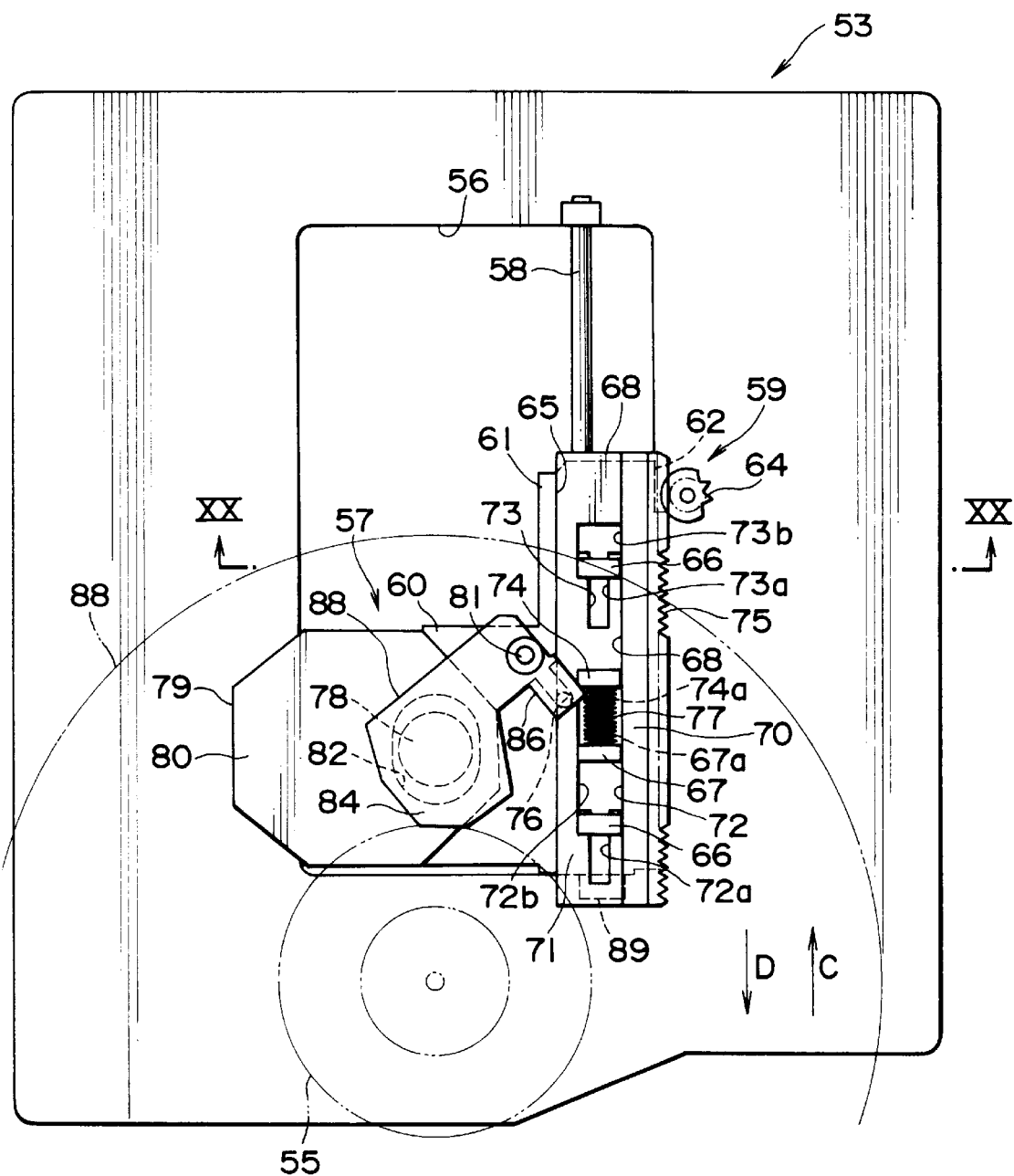
FIG. 9 is a plan showing a state in which the optical pickup apparatus of a disc player as a disc recording and/or reproducing apparatus equivalent to a second embodiment according to the present invention is located in the innermost position and a shutter is located in a closed position.
Figure 11:
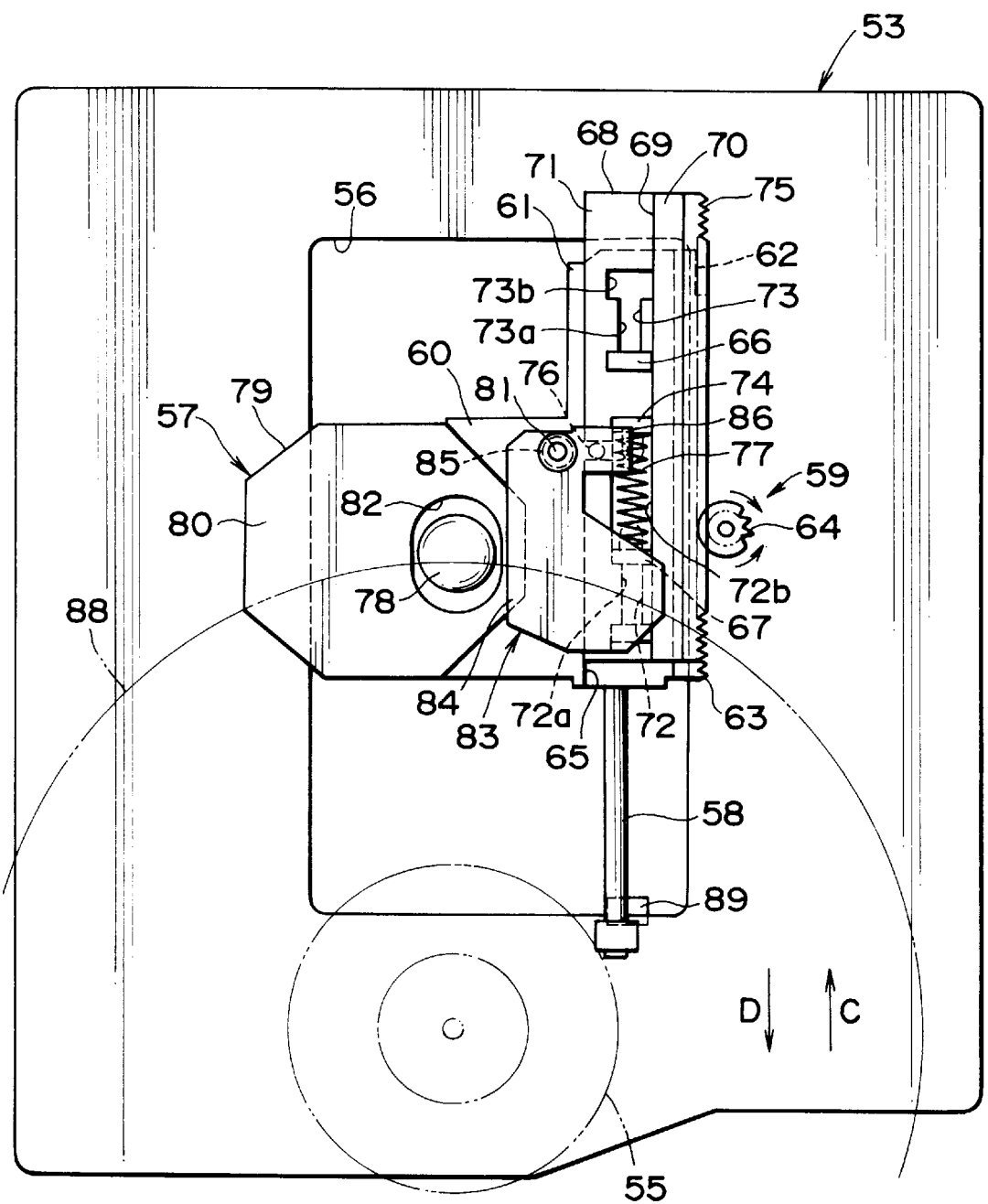
FIG. 11 is a plan showing a state in which the optical pickup apparatus of the disc player as the disc recording and/or reproducing apparatus equivalent to the second embodiment according to the present invention is located in the outermost position and the shutter is located in an open position.

The optical pickup apparatus 57 is moved between when it is moved to the rearmost position of the mechanical chassis 53 shown in FIG. 11, that is, the outermost position of an optical disc and in the meantime, when the optical pickup apparatus is moved to the forefront of the mechanical chassis 53 shown in FIG. 9, that is, the innermost position of the optical disc by the feed mechanism 59. The optical pickup apparatus 57 is moved to the inner position of an optical disc when the reproduction of the optical disc is stopped.

Figure 19:
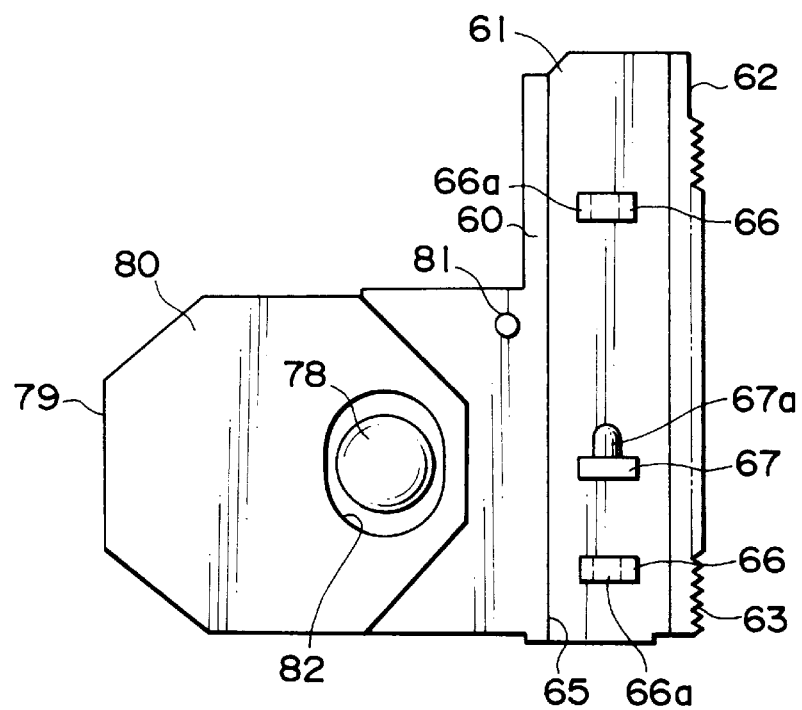
FIG. 19 is a plan showing the constitution of the optical pickup apparatus.

A guide groove 65 extended from the front end to the rear end as shown in FIG. 9 or 20 is formed in the substantial center in the direction of the width of the upper surface of the rack part 61. T-shaped projections 66 each upper part of which is protruded substantially in the shape of a letter T are integrally protruded upward as shown in FIG. 20 in two locations of a position close to the front end and a position close to the rear end in the guide groove 65 and further as shown in FIG. 19, a spring fitting projection 67 provided with a substantially cylindrical convex portion 67*a* protruded backward is integrally protruded in a little forward position between these T-shaped projections 66.

A slider 68 is attached to the rack 61 so that the slider can be slid back and forth.

Figure 18:
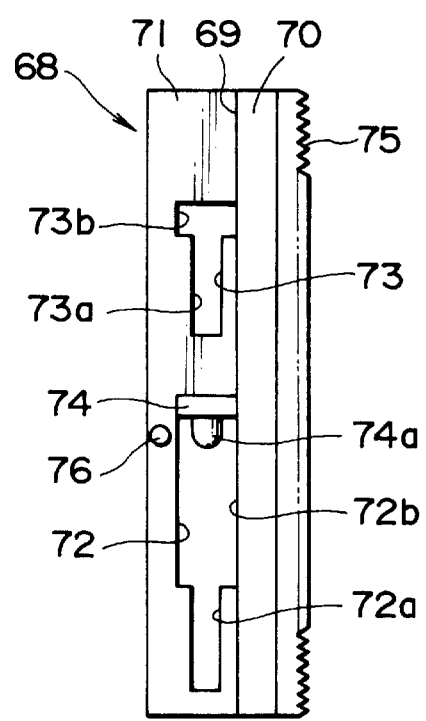
FIG. 18 is a plan showing the constitution of a slider.

The slider 68 is formed by a substantially rectangular plate a little longer than the longitudinal length of the rack part 61 as shown in FIG. 18 and a part different in a level 69 extended from the front end to the rear end is formed a little on the right side of the upper surface thereof. The slider 68 is divided into the upper part 70 and the lower part 71 by this part different in level 69. Long holes 72 and 73 longer back and forth the respective shapes of which are different are formed in two locations in the lower part 71 with the long holes separated to some extent back and forth in a straight line. Referring to the long hole 72 on the front side, the transverse opening width of the front half 72*a* is formed so that it is approximately the half of that of the rear half 72*b*, a substantially cylindrical projection 74*a* directed forward is formed on the wall surface directed forward of the rear opening edge and this part functions as a spring fitting part 74. The long hole 73 on the rear side is formed substantially in the shape of a letter T when viewed from the top and the opening width at the rear end is formed so that it is formed approximately twice as wide as that of the front part 73*a* to be a wider part 73*b*.

The long holes 72 and 73 are formed so that the width of the rear half 72*b* and that of the wider part 73*b* of the long hole 73 are respectively substantially the same as the width of each top 66*a* of the above T-shaped projections 66 and the width of the front half 72*a* and that of the front part 73*a* are respectively formed substantially the same as that of each lower part except each top 66*a* of the T-shaped projections 66.

Figure 13:
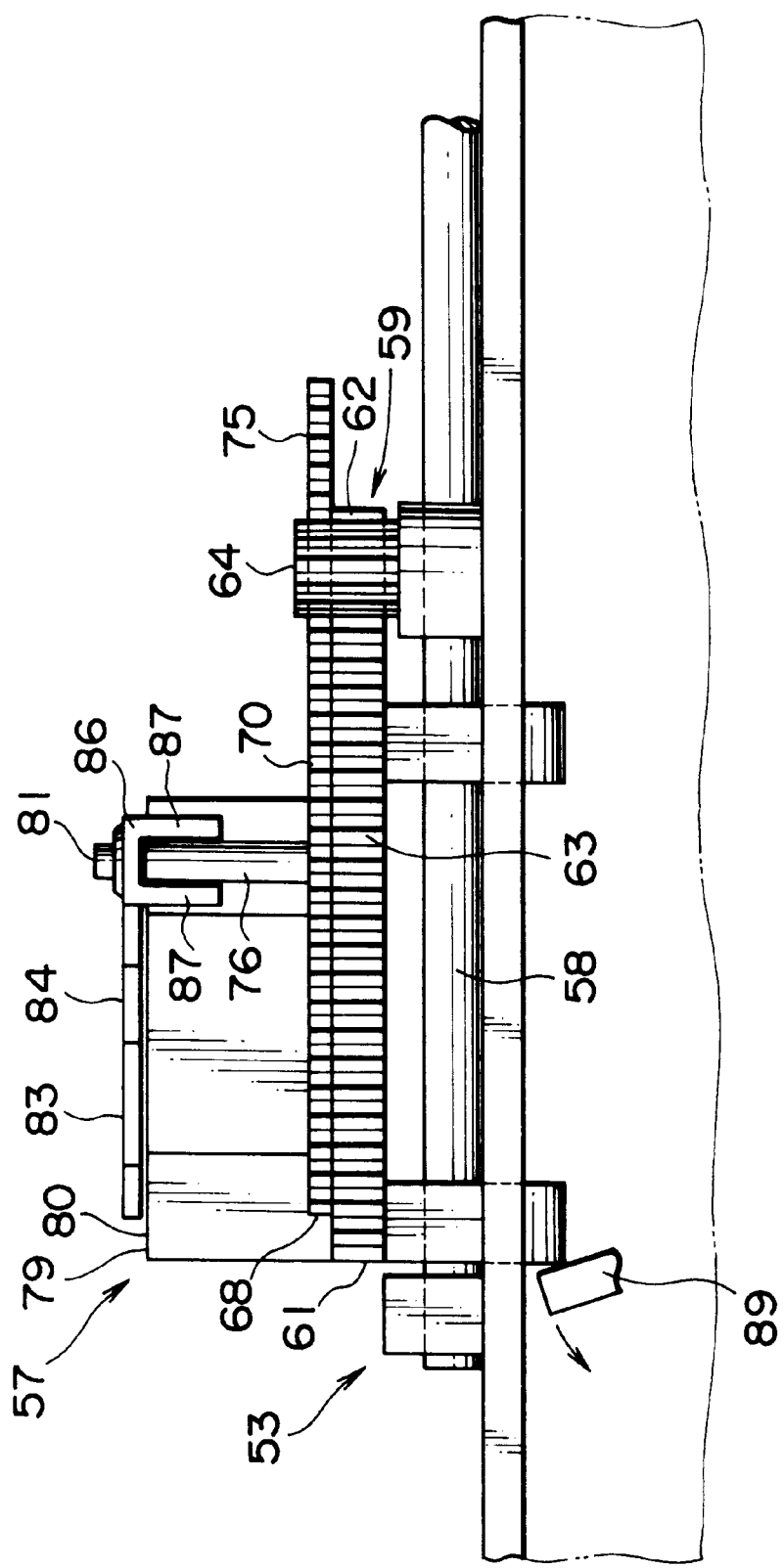
FIG. 13 is the side view of the main part showing a state in which the optical pickup apparatus is located in the innermost position and the shutter is located in an open position.
Figure 14:
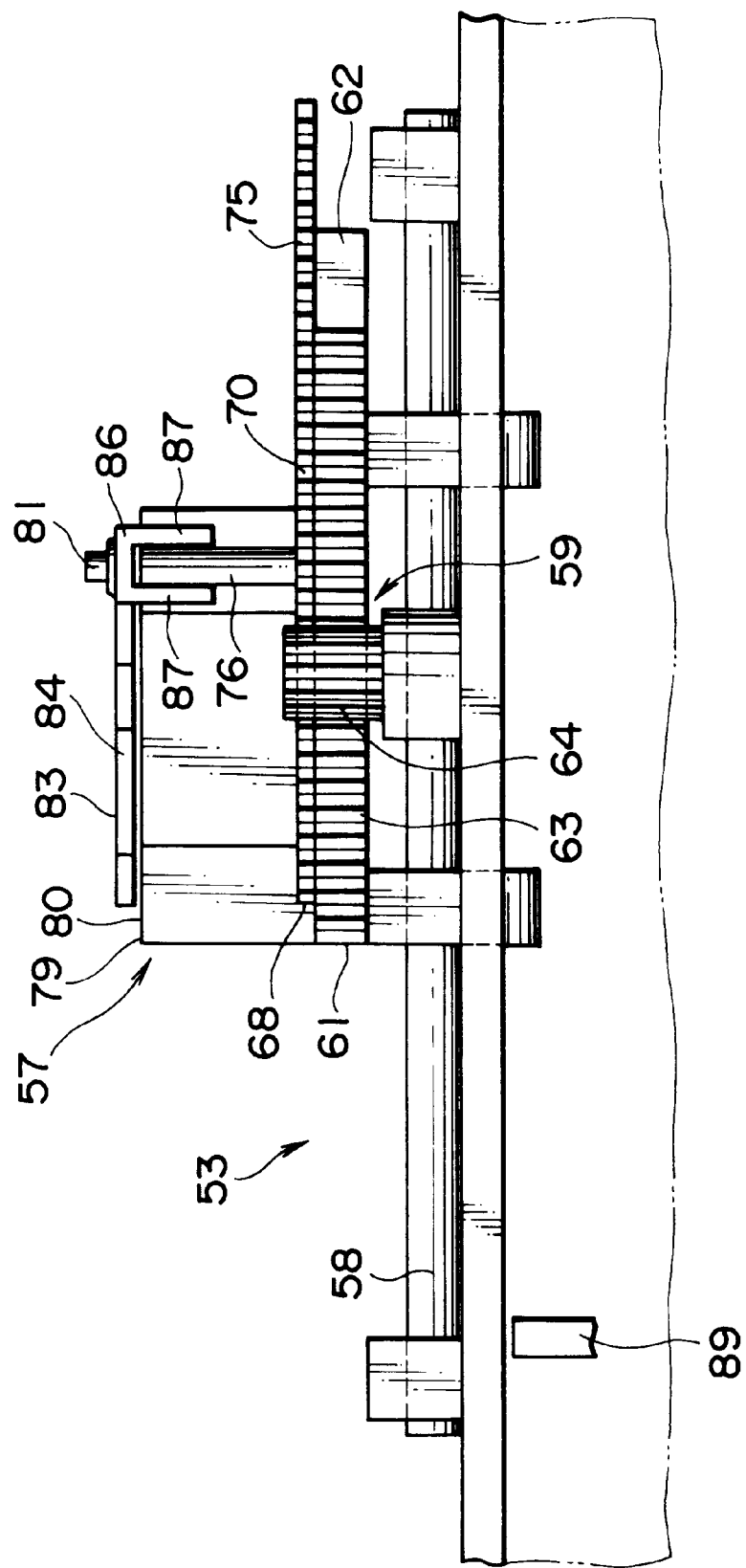
FIG. 14 is the side view of the main part showing a state in which the optical pickup apparatus is located in the outermost position and the shutter is located in an open position.

A rack 75 is formed on the right side of the above upper part 70. A cylindrical acting projection 76 as shown in FIGS. 9 and 13 is integrally protruded upward substantially in the center in the longitudinal direction at the left edge of the slider 68.

As described above, the slider 68 is provided on the rack part 61 of the optical pickup apparatus 57 so that the slider can be moved in the radial direction of a disc or in the feed direction of the optical pickup apparatus 57. That is, the lower part 71 of the slider 68 is fitted to the guide groove 65 in the rack part 61 by aligning the rear half 72*b* of the long hole 72 and the wider part 73*b* of the long hole 73 of the slider 68 with the respective T-shaped projections 66 of the rack part 61 so that the lower part of the slider can be slid, the tops 66*a* of the T-shaped projections 66 are respectively protruded upward through the rear half 72*b* of the long hole 72 and the wider part 73*b* of the long hole 73 and the spring fitting projection 67 is located in the rear half 72*b* of the long hole 72 so that the spring fitting projection is opposite to the spring fitting part 74. When the slider 68 is slid backward, that is, in the direction shown by an arrow in FIG. 9 until the T-shaped projections 66 are respectively located in the front half 72*a* and the front part 73*a* which are both narrower parts of the long holes 72 and 73, the slider 68 can be moved on the rack part 61 in the directions shown by the arrows C and D in FIG. 9 with it put among the rack part 61 and the tops 66*a* of the T-shaped projections 66, being guided by the guide groove 65 and the T-shaped projections 76 relatively slid in the front half 72*a* and the front part 73*a* of the long holes 72 and 73.

A coil spring 77 is located with it compressed among the rack part 61 and the spring fitting projections 67 and 74 of the slider 68, both ends thereof are supported by the convex portions by engaging both ends with the convex portions 67*a* and 74*a*. As a result, the slider 68 is pressed in the direction shown by the arrow C in FIG. 9 by the pressure of the coil spring 77 on the rack part 61 and the spring fitting projection 67 comes in contact with the front edge of the rear half 72*b* of the long hole 72. At this time, the rack 75 of the slider 68 and the rack 63 of the rack part 61 of the base 60 are located vertically and as the rack 75 of the slider 68 can be a little dislocated in the direction shown by the arrow D in FIG. 9, they are respectively engaged with the pinion 64 without a backlash.

Various optical components such as a beam splitter and a laser diode respectively not shown are arranged in a predetermined position on the left side of the above base 60 in addition to the objective lens 78 in the optical pickup apparatus 57 and the periphery is covered with a case body 79. A turning shaft 81 for supporting a shutter described later so that the shutter can be turned is protruded at the base of the rack part 61 at the rear end of the base 60 and on the right side of the case body 79 as shown in FIG. 19. Beams radiated from the objective lens 78 are focused on the signal recorded surface of an optical disc. The beams reflected by the optical disc are received by a photo detector of the optical pickup apparatus 57. A regenerative signal and various error signals of an optical disc are generated based upon the output from the photo detector.

The case body 79 is formed by a substantially octagonal cover when viewed from the top of the optical pickup apparatus 57 as shown FIGS. 9 to 12 and fixed on the base 60 with it covering various optical components. A substantially elliptic hole 82 is formed on the right side of the upper surface 80 of the case body 79 and the objective lens 78 is exposed outside via the hole 82. Beams are radiated toward an optical disc through this hole 82.

The shutter 83 consists of a main part 84 formed by a thin plate for example so that the top of a rice scoop is bent to the right horizontally from a boundary between the top and the handle when viewed from the top of the optical pickup apparatus 57 as shown in FIGS. 1 to 4 and 17, a cylindrical part 85 integrally protruded from the center of the rear end of the main part 84 downward and a pressed part 86 protruded from the right edge of a part in which the cylindrical part 85 is protruded at the rear end of the main part 84 and the above three parts are integrated using synthetic resin.

Figure 17:
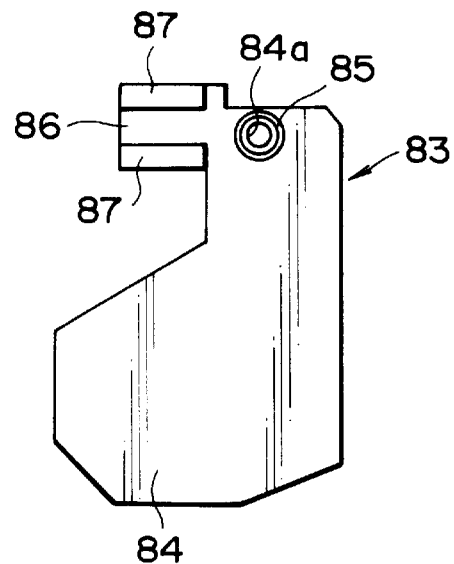
FIG. 17 is a bottom view showing the shutter in the second embodiment.

As shown in FIG. 17, pressed pieces 87 are integrally protruded from the front end and the rear end of the pressed part 86 downward. The length of the cylindrical part 85 is a little longer than the height when the case body 79 is attached onto the base 60. A hole 84a is also provided in a position corresponding to the inner hole of the cylindrical part 85 in the main part 84 and the hole 84a is open to the upper surface of the main part 84.

The shutter 83 formed as described above is attached to the optical pickup apparatus 57 in the following state as shown in FIGS. 9 to 12.

That is, the cylindrical part 85 is fitted to the turning shaft 81 of the base 60, a part for preventing from falling is provided at the upper end of the turning shaft 81 protruded upward from the hole 84a of the main part 84 by a suitable method and the acting projection 76 of the slider 68 is located between the pressed pieces 87 of the pressing part 86. Therefore, the shutter 83 is turned clockwise or counterclockwise with the turning shaft 81 of the base 60 as the center of turning by the change of the position of the acting projection 76 caused by the movement of the slider 68 driven by the pinion 64.

Figure 10:
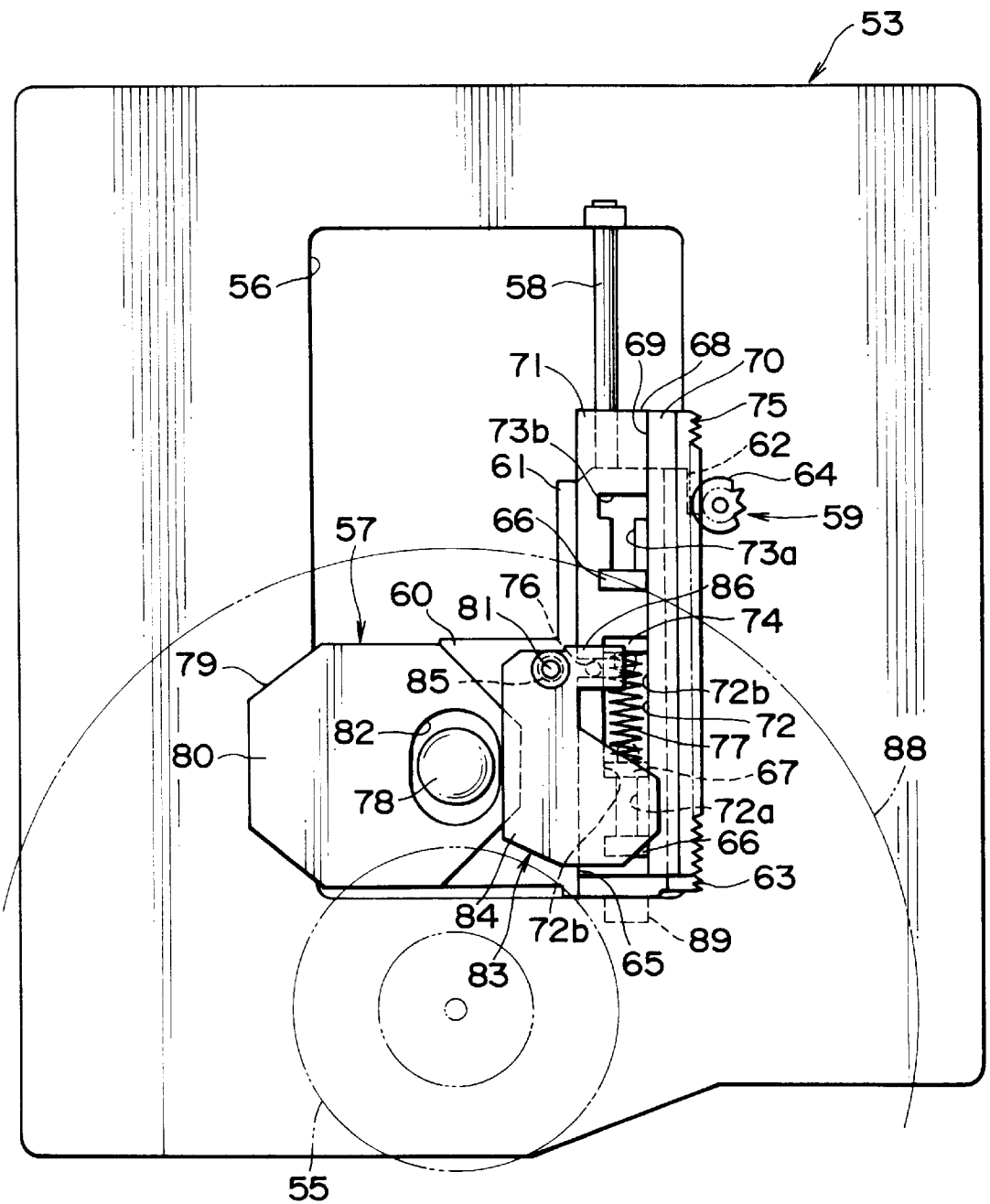
FIG. 10 is a plan showing a state in which the optical pickup apparatus of the disc player as the disc recording and/or reproducing apparatus equivalent to the second embodiment according to the present invention is located in the innermost position and the shutter is located in an open position.
Figure 12:
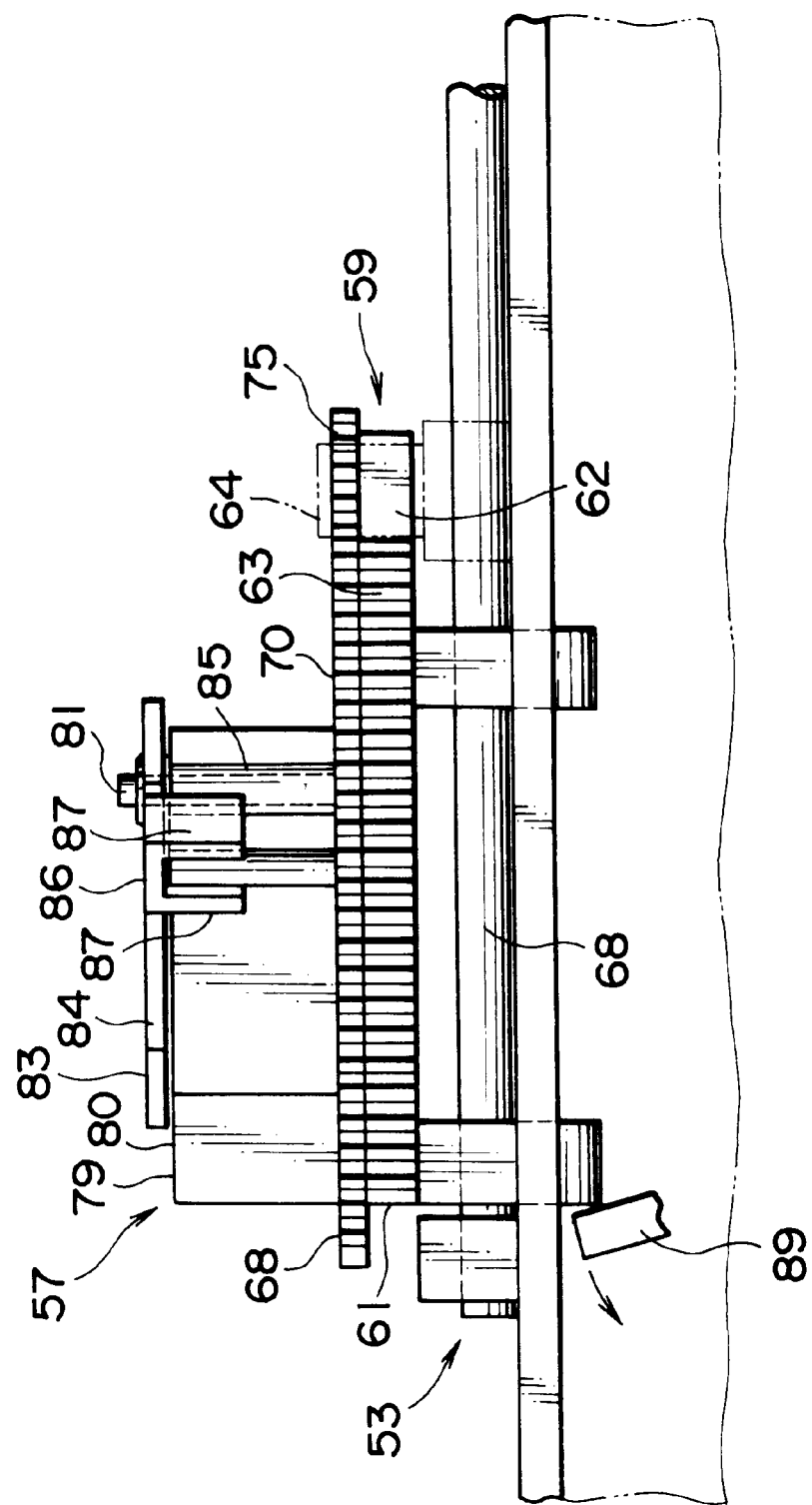
FIG. 12 is the side view of the main part showing a state in which the optical pickup apparatus is located in the innermost position and the shutter is located in a closed position.

The optical pickup apparatus 57 is moved between the front end position shown in FIG. 10, that is, a position for reading a table of contents (TOC) in which the time codes of an optical disc (a compact disc in case an optical disc is a compact disc) are recorded and the outermost position of the optical disc shown in FIG. 12 when the disc player 51 is operated and designed so that the respective positions are detected by a detecting mechanism such as a limit switch.

The operation of the disc player 51 and the operation of the shutter 83 in accordance with the operation of the disc player will be described below.

As shown in FIG. 15, an optical disc 88 is loaded and unloaded onto/from a disc loaded surface not shown of the disc tray 54 with the disc tray 54 pulled out from the front face of the housing 52 (in the pulled-out position). In this pulled-out position of the disc tray 54, the front end of the mechanical chassis 53 is held with it lowered. At this time, the shutter 83 closes the hole 82 of the case body 79. The optical disc 88 is reproduced with the disc tray 54 pulled in the housing 52 (in the pulled-in position) as shown in FIG. 16.

Referring to the reproduction of the optical disc 88, when an instruction to reproduce the optical disc 88 is issued in the pulled-in position of the disc tray 54, the lowered front end of the mechanical chassis 53 is lifted by a lifting mechanism not shown, hereby the disc table 55 is also lifted, the upper surface thereof comes in contact with the lower surface in the center of the optical disc 88, the optical disc 88 is lifted from the disc loaded surface of the disc tray 54 because the disc table 55 is a little lifted from there. Afterward, the optical disc 88 is chucked by a chucking mechanism not shown and the disc table 55 and also rotated in accordance with the rotation of the disc table 55 by a spindle motor.

When the operation of the disc player 51 is stopped including when the disc player is powered off, the optical pickup apparatus 57 is defined so that it is always held in the innermost position of the optical disc 88 on the mechanical chassis 53 as shown in FIGS. 10 and 13 and at this time, a limit switch 89 for detecting that the optical pickup apparatus 58 reaches the innermost position of the optical disc is on.

The optical pickup apparatus 57 stopped in the innermost position of the optical disc 88 is moved a little backward by the feed mechanism 59 until the limit switch 89 is turned off, moved forward until the limit switch 89 is turned on again and stopped in the front end position. The above front end position is a position in which TOC described above is read and the shutter 83 is moved to the open position in which the hole 82 of the case body 79 is exposed. Afterward, the optical pickup apparatus 57 is suitably moved in the radial direction of the optical disc 88 in the range between the innermost position and the outermost position of the optical disc 88 by the feed mechanism 59 so as to read a signal.

Next, when an instruction to stop the operation is issued while the optical disc 88 is reproduced, the rotation of the disc table 55 is stopped, the optical pickup apparatus 57 is simultaneously moved in the direction shown by the arrow D in FIG. 9 by the feed mechanism 59, the front end of the mechanical chassis 53 is simultaneously lowered and the optical disc 88 is loaded onto the disc loaded surface of the disc tray 54. When an instruction to eject the disc is issued, the disc tray 54 is moved from the pulled-in position shown in FIG. 16 to the pulled-out position shown in FIG. 16 after the optical disc 88 is loaded onto the disc loaded surface of the disc tray 54 in addition to the operation when an instruction to stop is issued. An instruction to start reproduction, an instruction to stop reproduction and an instruction to eject a disc are issued by a controller not shown when a user operates a switch on an operator console not shown of the disc player 51.

At this time, the optical pickup apparatus 57 is moved in the direction shown by the arrow D in FIGS. 9 and 11 on the mechanical chassis 53 by the feed mechanism 59. Even if the optical pickup apparatus 57 reaches the innermost position of the optical disc and the limit switch 89 is turned on, a predetermined time feed mechanism 59 further continues to be operated.

That is, when the optical pickup apparatus 57 is further moved a little in the inner direction of the disc exceeding the innermost position of the disc by the feed mechanism 59 after the limit switch 59 is operated, the engagement between the rack 63 and the pinion 64 is released because they reach the cut-out part 62 and the pinion is engaged with only the rack 75 of the slider 68. Therefore, only the slider 68 is further moved in the inner direction of the disc by the rotation of the pinion 64, compressing the coil spring 77 and the acting projection 76 is accordingly moved in the inner direction of the disc. As a result, this movement is transmitted to the shutter 83 via the pressed part 86 of the shutter 83 fitted to the acting projection 76, the shutter 83 is turned clockwise when viewed from the top of the optical pickup apparatus 57 with the turning shaft 81 as the center, the main part 84 is moved to the closed position for covering the hole 32 as shown in FIGS. 9 and 12 to hide the objective lens 78 of the optical pickup apparatus 57 on the upper surface 86 of the case body 79 and the rotation of the pinion 64 is stopped.

When an instruction to reproduce the disc player 51 is issued in a state in which the operation is stopped, the pinion 64 starts to be rotated to the contrary to the above description, at first only the slider 68 is moved in the direction shown by the arrow D in FIG. 9 and the acting projection 76 is also moved in the direction shown by the arrow D, that is, in the outer direction of the disc accordingly. As a result, this movement is transmitted to the shutter 83 via the pressed part 86, the shutter 83 is turned counterclockwise when viewed from the top of the optical pickup apparatus 57 with the turning shaft 81 as the center, the movement of the slider 68 on the rack part 61 is stopped with the spring fitting projection 67 of the rack part 61 in contact with the front edge of the rear half 72b of the long hole 72 and the main part 84 of the shutter 83 is moved to a position in which the hole 82 of the case body 79 is not covered, that is, to the open position in which the objective lens 78 is exposed as shown in FIGS. 10 and 17.

When the pinion 64 further continues to be rotated, the only movement of only the slider 68 is stopped with the spring fitting projection 67 in contact with the front edge of the rear half 72b of the long hole 72, the front edge of the front half 72a of the long hole 72 and the front edge of the long hole 73 respectively press the T-shaped projections 76 on the front side of the rack part 61 in the outer direction of the disc, hereby the slider 68 and the rack part 60 are moved in the outer direction of the disc together, the teeth of the pinion 64 are released from the cut-out part 62 of the rack part, engaged with the rack 63 and the overall optical pickup apparatus 57 is further moved in the direction shown by the arrow D in FIG. 9, that is, in the outer direction of the disc.

As described above, as the feed mechanism for moving the optical pickup apparatus also functions as a mechanism for moving a shutter opening/closing mechanism for opening or closing the shutter and as optical pickup moving means in the disc player equivalent to the second embodiment, a mechanism for preventing the lens of the optical pickup apparatus from being contaminated can be realized by partial design change in which components such as the shutter opening/closing mechanism and the shutter are added and only a part of control means for the feed mechanism is changed.

In the above each embodiment, the constitution that the shutter is arranged between an optical disc and the end of the case body on the upper surface of the case body is described as an example, however, the shutter may be also arranged between the inner surface of the case body and the objective lens. In the above embodiments, the constitution that when the optical pickup apparatus is located in the innermost position of an optical disc, the upper surface of the objective lens is covered with the shutter is described, however, when reproduction is stopped, the optical pickup apparatus is moved to the outermost position of the disc and the upper surface of the objective lens may be also covered with the shutter in the position. In the above embodiments, the disc player for reading data recorded on an optical disc is described as an example, however, the present invention can be also applied to an optical disc recording apparatus for recording data on an optical disc or an optical disc recording and/or reproducing apparatus.

The present invention may be variously transformed in the range in which the object of the present invention is not greatly deviated.

What is claimed is:

1. An optical disc recording and/or reproducing apparatus, comprising:

a carrier mechanism for carrying a disc inside and outside said apparatus;

an optical pickup apparatus provided with an objective lens for radiating beams on the disc carried by said carrier mechanism;

a shutter provided to said optical pickup apparatus, said shutter movable between a first position for exposing the upper surface of said objective lens and a second position for closing the upper surface of said objective lens;

a lifting mechanism for lifting and lowering said optical pickup apparatus between a lifted position for radiating beams on a disc carried by said carrier mechanism and a lowered position under said lifted position; and a moving mechanism for moving said shutter to the first position when the lifting mechanism moves the optical pickup apparatus to the lifted position from the lowered position and for moving said shutter to the second position when the lifting mechanism moves the optical pickup apparatus to the lowered position from the lifted position.

2. An optical disc recording and/or reproducing apparatus according to claim 1, wherein:

said moving mechanism further moves said shutter from said second position to said first position during recording or reproduction; and said moving mechanism further moves said shutter from said first position to said second position when a disc is carried outside said apparatus by said carrier mechanism.

3. An optical disc recording and/or reproducing apparatus according to claim 2, wherein:

said lifting mechanism lowers said optical pickup apparatus when a disc is being carried by said carrier mechanism and/or when recording or reproduction is stopped; and said moving mechanism moves said shutter according to the operation of said lifting mechanism.

4. An optical disc recording and/or reproducing apparatus according to claim 3, wherein:

said moving mechanism is provided with a moving member for moving said shutter from said first position to said second position against pressure by a pressing member when said optical pickup apparatus is moved from said lifted position to said lowered position by said pressing member for pressing said shutter toward said first position and said lifting mechanism.

5. An optical disc recording and/or reproducing apparatus according to claim 4, wherein:

said moving mechanism is further provided with a cam member for operating said moving member when said optical pickup apparatus is lifted or lowered between said lifted position and said lowered position by said lifting mechanism.

6. An optical disc recording and/or reproducing apparatus according to claim 2, wherein:
   said apparatus is further provided with a feed mechanism for moving said optical pickup apparatus in the radial direction of a disc; and
   said moving mechanism further moves said shutter according to the operation of said feed mechanism.

7. An optical disc recording and/or reproducing apparatus according to claim 6, wherein:
   said moving mechanism moves said shutter from said second position to said first position when said optical pickup apparatus is moved to a further inner position across the innermost position of a disc by said feed mechanism.

8. An optical disc recording and/or reproducing apparatus according to claim 7, wherein:
   said feed mechanism is provided with a motor, a pinion to which driving force from the motor is transmitted and a first rack provided to said optical pickup apparatus and engaged with said pinion; and
   said moving mechanism is provided with a second rack engaged with said pinion and attached to said first rack so that the second rack can be moved.

9. An optical disc recording and/or reproducing apparatus according to claim 8, wherein:
   said apparatus is further provided with a detecting mechanism for detecting that said optical pickup apparatus reaches said innermost position by said feed mechanism; and
   said feed mechanism further moves said shutter from said first position to said second position by moving said second rack in the inner direction of a disc by said pinion after it is detected by said detecting mechanism that said optical pickup apparatus reaches said innermost position.

10. An optical pickup apparatus used for the recording and/or reproduction of an optical disc, comprising:
    an objective lens for focusing beams on a disc;
    a shutter movable between a first position for exposing the upper surface of said objective lens and a second position for closing the upper surface of said objective lens;
    a feed mechanism for moving said optical pickup apparatus in the radial direction of a disc;
    a lifting mechanism for lifting and lowering said optical pickup apparatus between a lifted position and a lowered position under said lifted position; and
    a moving mechanism for moving said shutter to the first position when the lifting mechanism moves the optical pickup apparatus to the lifted position from the lowered position and for moving said shutter to the second position when the lifting mechanism moves the optical pickup apparatus to the lowered position from the lifted position and also for moving said shutter between said first position and said second position according to the operation of said feed mechanism.

11. An optical pickup apparatus according to claim 10, wherein:
    said moving mechanism moves said shutter from said second position to said first position when said optical pickup apparatus is moved to a further inner position across the innermost position of a disc by said feed mechanism.

12. An optical pickup apparatus according to claim 11, wherein:
    said feed mechanism is provided with a motor, a pinion to which driving force from the motor is transmitted and a first rack provided to said optical pickup apparatus and engaged with said pinion; and
    said moving mechanism is provided with a second rack engaged with said pinion and attached to said first rack so that the second rack can be moved.

13. An optical pickup apparatus according to claim 12, wherein:
    said apparatus is further provided with a detecting mechanism for detecting that said optical pickup apparatus reaches said innermost position by said feed mechanism; and
    said feed mechanism moves said shutter from said first position to said second position or from said second position to said first position further by moving said second rack in the inner direction of a disc by said pinion after it is detected by said detecting mechanism that said optical pickup apparatus reaches said innermost position.

14. An optical pickup apparatus according to claim 12, wherein:
    said feed mechanism is provided with a pressing member for pressing either of said first rack and said second rack in the direction for removing a backlash between the other rack and said pinion.

15. An optical disc recording and/or reproducing apparatus, comprising:
    a carrier mechanism for carrying a disc inside and outside said apparatus;
    a chassis provided with an optical pickup apparatus provided with an objective lens for radiating beams on a disc carried by said carrier mechanism in a state focused by said objective lens and a disc rotating mechanism for rotating a disc carried by said carrier mechanism;
    a shutter provided to said optical pickup apparatus so that the shutter can be moved between a first position for exposing the upper surface of said objective lens and a second position for closing the upper surface of said objective lens for exposing or closing the upper surface of said objective lens;
    a lifting mechanism for lifting or lowering said chassis between a lifted position for rotating a disc carried by said carrier mechanism by said disc rotating mechanism and a lowered position for separating said disc rotating mechanism from a disc carried by said carrier mechanism;
    a moving mechanism for moving said shutter to the first position when the lifting mechanism lifts the chassis to the lifted position from the lowered position and for moving said shutter to the second position when the lifting mechanism lowers the chassis to the lowered position from the lifted position.

16. An optical disc recording and/or reproducing apparatus according to claim 15, wherein:
    said apparatus is further provided with a feed mechanism for feeding said optical pickup apparatus in the radial direction of a disc; and
    said shutter is further moved from said first position to said second position or from said second position to said first position by said moving mechanism when said optical pickup apparatus is moved to the innermost position of a disc by said feed mechanism.

17. An optical pickup apparatus according to claim 16, wherein:

said feed mechanism is provided with a motor, a pinion to which driving force from the motor is transmitted and a first rack provided to said optical pickup apparatus and engaged with said pinion; and said moving mechanism is provided with a second rack engaged with said pinion and attached to said first rack so that the second rack can be moved.

18. An optical pickup apparatus according to claim 17, wherein:

said apparatus is further provided with a detecting mechanism for detecting that said optical pickup apparatus reaches said innermost position by said feed mechanism; and said feed mechanism moves said shutter from said first position to said second position or from said second position to said first position by further moving said second rack in the inner direction of a disc by said pinion after it is detected by said detecting mechanism that said optical pickup apparatus reaches said innermost position.

* * * * *